US011206602B2

(12) United States Patent
Huang-Fu et al.

(10) Patent No.: US 11,206,602 B2
(45) Date of Patent: Dec. 21, 2021

(54) ENHANCEMENT FOR CLOSED ACCESS GROUPS

(71) Applicant: MEDIATEK INC., Hsinchu (TW)

(72) Inventors: Chien-Chun Huang-Fu, Hsinchu (TW); Marko Niemi, Oulu (FI)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/861,624

(22) Filed: Apr. 29, 2020

(65) Prior Publication Data

US 2020/0351755 A1 Nov. 5, 2020

Related U.S. Application Data

(60) Provisional application No. 62/841,880, filed on May 2, 2019.

(51) Int. Cl.
*H04W 72/00* (2009.01)
*H04W 48/02* (2009.01)
(Continued)

(52) U.S. Cl.
CPC ............. *H04W 48/02* (2013.01); *H04W 8/08* (2013.01); *H04W 84/042* (2013.01)

(58) Field of Classification Search
CPC ....... H04W 12/00514; H04W 12/0401; H04W 12/06; H04W 76/11; H04W 84/045;
(Continued)

(56) References Cited

U.S. PATENT DOCUMENTS

2011/0212724 A1* 9/2011 Wirtanen ............... H04W 88/02
455/435.2
2017/0238180 A1* 8/2017 Li ........................ H04W 48/08
455/411
(Continued)

FOREIGN PATENT DOCUMENTS

WO WO 2018/228517 A1 12/2018

OTHER PUBLICATIONS

International Search Report and Written Opinion dated Jul. 29, 2020 in PCT/CN2020/088371, 9 pages.
(Continued)

*Primary Examiner* — Joseph Arevalo
(74) *Attorney, Agent, or Firm* — Oblon, McClelland, Maier & Neustadt, L.L.P.

(57) ABSTRACT

Aspects of the disclosure provide methods and an apparatus for enhancement of closed access groups (CAGs). For example, the apparatus can include a non-volatile memory, receiving circuitry, transmitting circuitry and processing circuitry. The receiving circuitry can be configured to receive a configuration update command message and a registration accept message, each of which includes a CAG information list IE containing a CAG information list. The transmitting circuitry can be configured to transmit a configuration update complete message and a registration request message. The processing circuitry can be configured to store the CAG information list of the CAG information list IE in the non-volatile memory, and select a public land mobile network based on the CAG information list stored in the non-volatile memory.

12 Claims, 10 Drawing Sheets

(51) Int. Cl.
  *H04W 8/08* (2009.01)
  *H04W 84/04* (2009.01)

(58) Field of Classification Search
  CPC ........... H04W 12/0013; H04W 12/004; H04W
      12/00512; H04W 12/04033; H04W
      12/1006; H04W 48/08; H04W 48/14;
      H04W 48/18; H04W 4/025; H04W 4/08;
      H04W 4/38; H04W 4/70; H04W 60/00;
      H04W 84/18; H04W 88/02; H04W 8/183;
          H04W 8/186; H04W 8/20; H04L
      63/0876; H04L 67/02; H04L 67/12; H04L
      67/28; H04L 9/0643; H04L 9/0861; H04L
              9/3236; H04L 9/3273
  USPC ......... 455/452.1, 435.1, 434, 444, 436, 517,
              455/556.1, 411, 456.3, 552.1
  See application file for complete search history.

(56) References Cited

U.S. PATENT DOCUMENTS

2018/0084391 A1* 3/2018 Li ........................ H04W 48/14
2019/0246267 A1* 8/2019 Nakarmi ......... H04W 12/04033
2020/0073013 A1* 3/2020 McArthur ............. G01D 21/00
2020/0245235 A1* 7/2020 Chun .................... H04W 48/18
2020/0252398 A1* 8/2020 Targali ................. H04L 9/3236
2020/0329524 A1* 10/2020 Park .................... H04W 72/042

OTHER PUBLICATIONS

Oppo, "Introducing support for Non-Public Networks and operations on Allowed CAG list". 3GPP TSG-SA WG2 Meeting #131, S2-1901613, Mar. 1, 2019, pp. 1-10.

Ericsson et al., "CAG selection", 3GPP TSG CT WG1 Meeting #116,C1-192481, Apr. 12, 2019, pp. 1-12.

ZTE et al., "Clarification on the CAG ID and slicing", 3GPP TSG-SA WG2 Meeting #132, S2-1904804, Apr. 12, 2019, 3 pages Combined Taiwanese Office Action and Search Report dated Dec. 28, 2020 in corresponding Taiwanese Patent Application No. 109114575 (with English Translation of Category of Cited Documents), 12 pages.

Combined Chinese Office Action and Search Report dated Jun. 2, 2021, in Patent Application No. 202080001917.7 (with English Translation of Category of Cited Documents), 7 pages.

Combined Taiwanese Office Action and Search Report dated May 19, 2021, in Patent Application No. 109114575 (with English Translation of Category of Cited Documents), 4 pages.

* cited by examiner

ENHANCEMENT FOR CLOSED ACCESS GROUPS

INCORPORATION BY REFERENCE

This present disclosure claims the benefit of U.S. Provisional Application No. 62/841,880, "Enhancement for Closed Access Groups (CAG)" filed on May 2, 2019, which is incorporated herein by reference in its entirety.

TECHNICAL FIELD

The present disclosure relates to wireless communications, and, more particularly, to methods and apparatus for enhancement for closed access groups (CAGs).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The wireless communications network has grown rapidly over the years. A long-term evolution (LTE) system provides high peak data rates, low latency, improved system capacity, and low operating cost. In LTE systems, an evolved universal terrestrial radio access network (E-UTRAN) includes a plurality of evolved Node-Bs (eNBs) that communicate with a plurality of mobile stations, which are also referred to as user equipments (UEs). 5G new radio (NR) is a new radio access technology (RAT) beyond LTE. For example, the NR peak rate requirement can be up to 20 Gbps, which is more than ten times of LTE.

In public land mobile network (PLMN) selection and cell search procedure, a UE scans all RF channels in the frequency band according to its capabilities to find available PLMNs and suitable cells. The UE can be provisioned a closed access group (CAG) information list by the network, and perform the PLMN selection and cell search procedure based on the CAG information list.

SUMMARY

Aspects of the disclosure provide a method for receiving and storing a closed access group (CAG) information list. The method can include receiving, at a user equipment (UE), a configuration update command message including a closed access group (CAG) information list information element (IE) containing a CAG information list, and storing the CAG information list of the CAG information list IE in a non-volatile memory. The method can further include transmitting, by the UE, a configuration update complete message, and selecting a cell in a public land mobile network (PLMN) based on the CAG information list stored in the non-volatile memory.

Aspects of the disclosure provide another method for receiving and storing a CAG information list. The method can include transmitting, by a UE, a registration request message indicating that the UE supports CAG, receiving a registration accept message including a CAG information list IE containing a CAG information list; and storing the CAG information list of the CAG information list IE in a non-volatile memory. The method can further include selecting a cell in a PLMN based on the CAG information list stored in the non-volatile memory.

According to an embodiment of the disclosure, the CAG information list can contain a CAG only indication, and the method can further include setting the CAG only indication of the CAG information list to a first value when the CAG information list stored in the non-volatile memory does not contain any CAG identifier for the PLMN. Further, the CAG information list can contain a CAG only indication, and the method can further include setting the CAG only indication of the CAG information list to a second value, and selecting a normal cell associated with the selected PLMN when the CAG information list stored in the non-volatile memory does not contain any CAG identifier for the PLMN.

According to some embodiments of the disclosure, the method can further include receiving from a CAG cell a cause value that indicates that the UE is not authorized to camp on the CAG cell, the CAG cell associated with a CAG identifier contained in the CAG information list stored in the non-volatile memory, and deleting the CAG identifier contained in the CAG information list stored in the non-volatile memory.

The non-volatile memory can be installed in the UE or installed in a USIM that is inserted into the UE. When the non-volatile memory is installed in the UE, the method according to some embodiments of the disclosure can further include deleting the CAG information list stored in the non-volatile memory when a universal subscriber identity module (USIM) is removed from the UE, or deleting the CAG information list stored in the non-volatile memory when a subscription permanent identifier (SUPI) provisioned from a USIM that is inserted into the UE does not match a SUPI stored in the non-volatile memory, and the selecting a cell in a PLMN based on the CAG information list stored in the non-volatile memory can include selecting a cell in a PLMN based on the CAG information list stored in the non-volatile memory when a SUPI provisioned from a USIM that is inserted into the UE matches a SUPI stored in the non-volatile memory.

Aspects of the disclosure also provide an apparatus, which can include a non-volatile memory, transmitting circuitry and receiving circuitry. The transmitting circuitry can be configured to transmitting a configuration update complete message and a registration request message, the registration request message indicating that the apparatus supports CAG. The receiving circuitry can be configured to receive a configuration update command message and a registration accept message, each of which can include a CAG information list IE containing a CAG information list. The apparatus can further include processing circuitry configured to store the CAG information list of the CAG information list IE in the non-volatile memory, and select a cell in a PLMN based on the CAG information list stored in the non-volatile memory.

The CAG information list can contain a CAG only indication, and the processing circuitry, when the CAG information list stored in the non-volatile memory does not contain any CAG identifier, can be further configured to set the CAG only indication of the CAG information list to a first value, or to set the CAG only indication of the CAG information list to a second value and select a normal cell within the selected PLMN.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

A user equipment (UE), after switched on, can run network and cell selection, to select a public land mobile network (PLMN) that it will register with and a cell that belongs to the selected PLMN. 5G system (5GS) deploys a non-public network (NPN) for non-public use. A public network integrated NPN is a non-public network deployed with the support of a PLMN. A closed access group (CAG) can be optionally used in order to prevent UEs that are not allowed to access a public network integrated NPN from accessing the public network integrated NPN. A CAG information list containing an allowed CAG list, i.e., a list of CAG identifiers that the UE is allowed to access, is provisioned from the network to the UE. The UE shall store the latest available CAG information for every PLMN for which it is provisioned and keep it stored when the UE is de-registered. However, the UE will lose the CAG information after switched off. In such a scenario, the network has to provision the CAG information to the UE again after the UE is switched on. Retaining the CAG information, such as in a non-volatile memory of the UE, can avoid the loss of CAG information, even after the UE is switched off. According to some aspects of the disclosure, the CAG information received in specific procedures, e.g., the generic UE configuration update procedure and a registration procedure, is stored in a non-volatile memory, and the UE, after switched off and then switched on again, can select a public land mobile network (PLMN) based on the CAG information stored in the non-volatile memory.

In addition to the CAG information, the network can also optionally provision a CAG-only indication whether the UE is only allowed to access 5GS via CAG cells. On occasion, the CAG information can be empty, i.e., containing no CAG identifier. In such a scenario, the UE cannot perform a cell selection procedure. According to some aspects of the disclosure, a CAG only indication of the CAG information list can be set to a first value when the CAG information list does not contain any CAG identifier. According to other aspects of the disclosure, when the CAG information list does not contain any CAG identifier, a CAG only indication of the CAG information list can be set to a second value, and a normal cell associated with a PLMN selected in the PLMN selection procedure can be selected.

Figure 1:
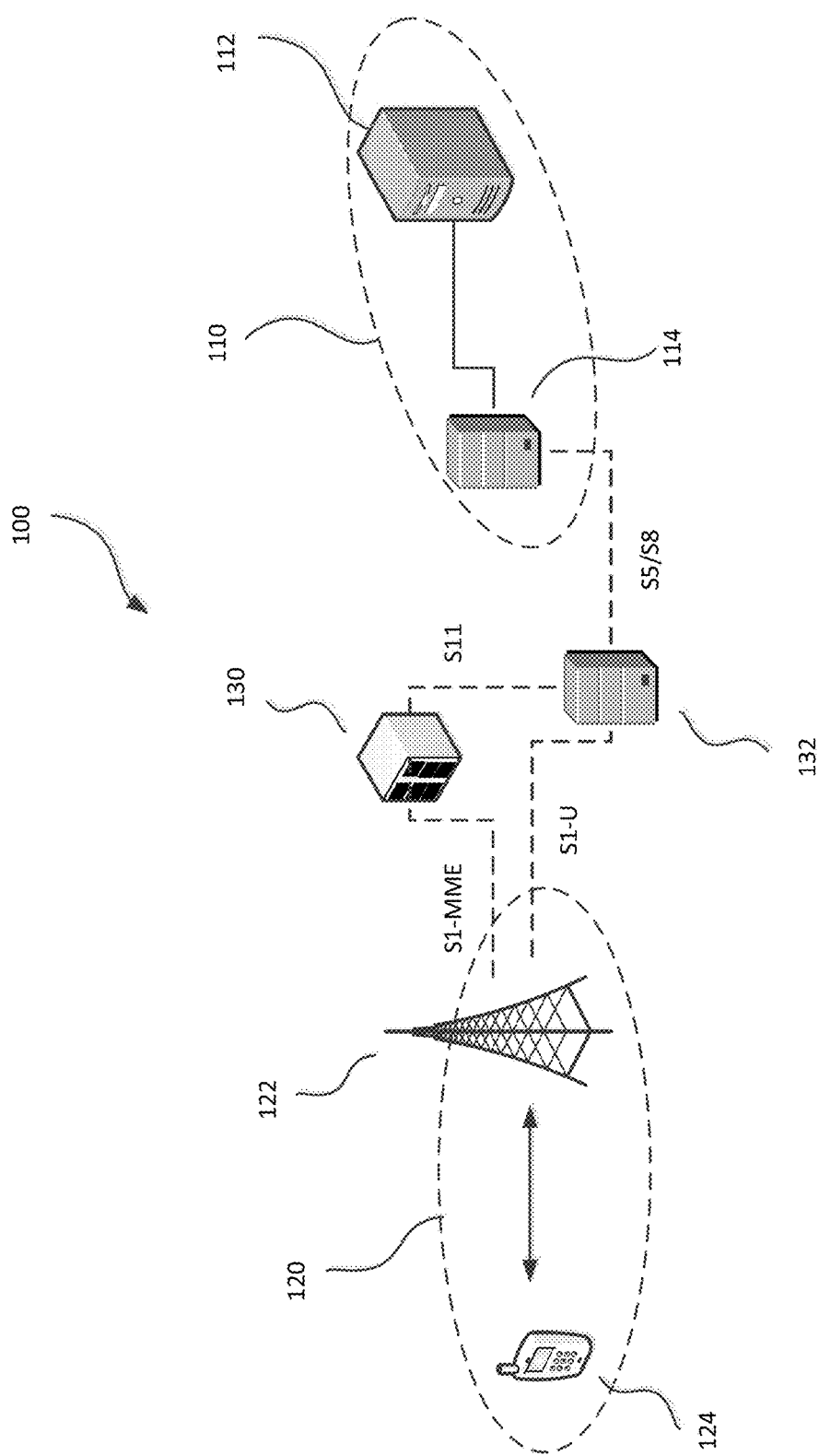
FIG. 1 is a diagram showing an exemplary public land mobile network (PLMN) according to some embodiments of the disclosure.

FIG. 1 is a diagram showing an exemplary public land mobile network (PLMN) 100 according to some embodiments of the disclosure. In an embodiment, the PLMN 100 is a network established and operated by an administration or recognized operating agency (ROA) for the specific purpose of providing land mobile communication services to the public. The PLMN 100 provides communication possibilities for mobile users, e.g., a UE 124. The PLMN 100 can provide service in one or a combination of frequency bands. A relationship exists between each subscriber and his home PLMN (HPLMN). If communications are handled over another PLMN, this PLMN is referred to as a visited PLMN (VPLMN). A PLMN area is a geographical area in which a PLMN provides communication services according to the specifications to mobile users. Within the PLMN area, the mobile users can set up calls to other users of a terminating network. The terminating network may be a fixed network, the same PLMN, another PLMN or other types of PLMN. Terminating network users can also setup calls to the PLMN. The PLMN area is allocated to a PLMN, which is determined by the service provider.

As shown in FIG. 1, an application server 112 can provide a variety of services by communication with a plurality of UEs including the UE 124 through a packet data network gateway (PDN GW) 114, a serving GW 132 and a base station (BS) (e.g., gNB) 122. In the example of FIG. 1, the application server 112 and the PDN GW 114 belong to a core network (CN) 110, and the UE 124 and its serving BS 122 belong to a radio access network (RAN) 120. The RAN 120 can provide radio access for the UE 124 via radio access technology (RAT). A mobility management entity (MME) or an access and mobility management function (AMF) 130 can communicate with the BS 122 via an S1-MME interface and communicate with the serving GW 132 and the PDN GW 114 via an S11 interface for access and mobility management of wireless access devices in the NR network 100. The serving GW 132 can communicate with the BS 122 via an S1-U interface, and communicate with the PDN GW 114 via an S5/S8 interface depending on whether the PDN GW 114 lies in a home or visited network. According to some embodiments of the disclosure, the UE 124 can be a smart phone, a wearable device, an Internet of Things (IoT) device, a tablet, and the like.

When the UE 124 is switched on, it searches for a network to connect. Once the UE 124 selects the desired network, it will try to attach to the network and attempt registration with the network. The UE 124 can support both manual and automatic network selection mechanisms. A universal subscriber identity module (USIM) securely stores an international mobile security identity (IMSI) and other related keys used to identify and authenticate subscribers on mobile telephone devices. The UE 124 can utilize all the information stored in the USIM related to network selection, e.g., a home PLMN (HPLMN), an operator-controlled PLMN selector list, a user-controlled PLMN selector list, and a forbidden PLMN list. After registering on a PLMN successfully, the UE 124 can indicate this PLMN ("the registered PLMN") and be capable of making and receiving calls on it. When a registration attempt on a PLMN is rejected by a network, the PLMN ID is written to the forbidden PLMN list stored in a data field on the USIM. If a successful registration is achieved on a PLMN in the forbidden PLMN list, the PLMN ID of the PLMN is removed from the forbidden PLMN list.

5G system (5GS) deploys a non-public network (NPN) for non-public use. A public network integrated NPN is a non-public network made available via PLMNs, e.g., by means of dedicated data network names (DNNs), or by one or more Network Slice instances allocated for the NPN. As network slicing does not enable the possibility to prevent UEs from trying to access the network in areas which the UEs are not allowed to use the Network Slice allocated for the NPN, closed access groups (CAGs) can be optionally used in order to prevent UEs that are not allowed to access a public network integrated NPN from accessing the public network integrated NPN. A CAG identifies a group of subscribers who are permitted to access one or more CAG cells associated with the CAG. CAG is used for the public network integrated NPNs to prevent UEs, which are not allowed to access the NPN via the associated cells, from automatically selecting and accessing the associated cells.

Figure 2:
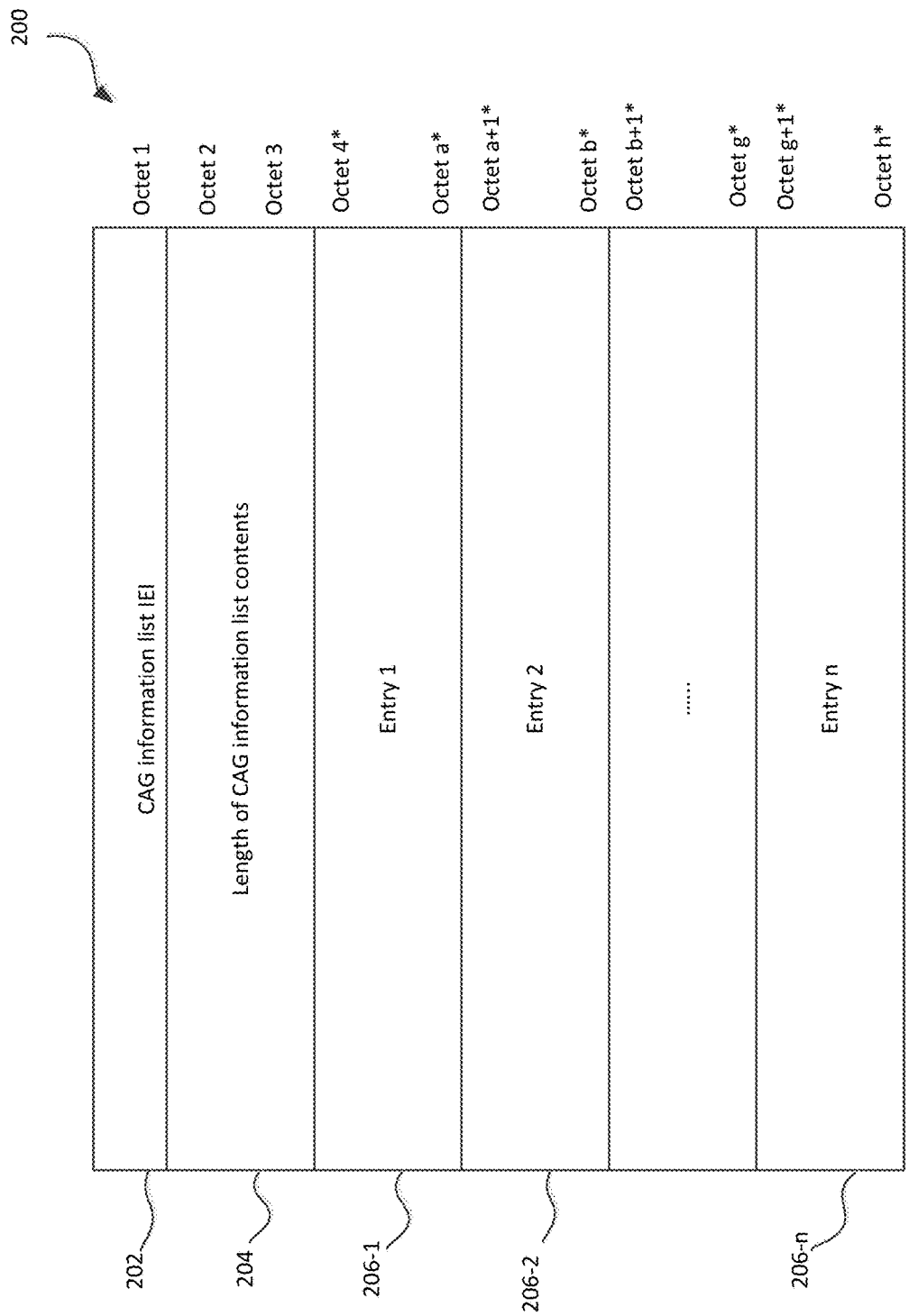
FIG. 2 shows an exemplary coded CAG information list information element (IE) according to some embodiments of the disclosure.

FIG. 2 shows an exemplary coded CAG information list information element (IE) 200 according to some embodiments of the disclosure. The CAG information list IE 200 can be provisioned by the network to a UE. In an embodiment, the CAG information list IE 200 can include a CAG information list IE identifier (IEI) 202, a length of CAG information list contents 204, and entries 206-1 to 206-n. The CAG information list IE 200 has a minimum length of three octets, one of which is for the CAG information list IEI 202 and two of which are for the length of CAG information list contents 204, which means that the entries 206-1 to 206-n are optional and are thus denoted by "*."

Figure 3:
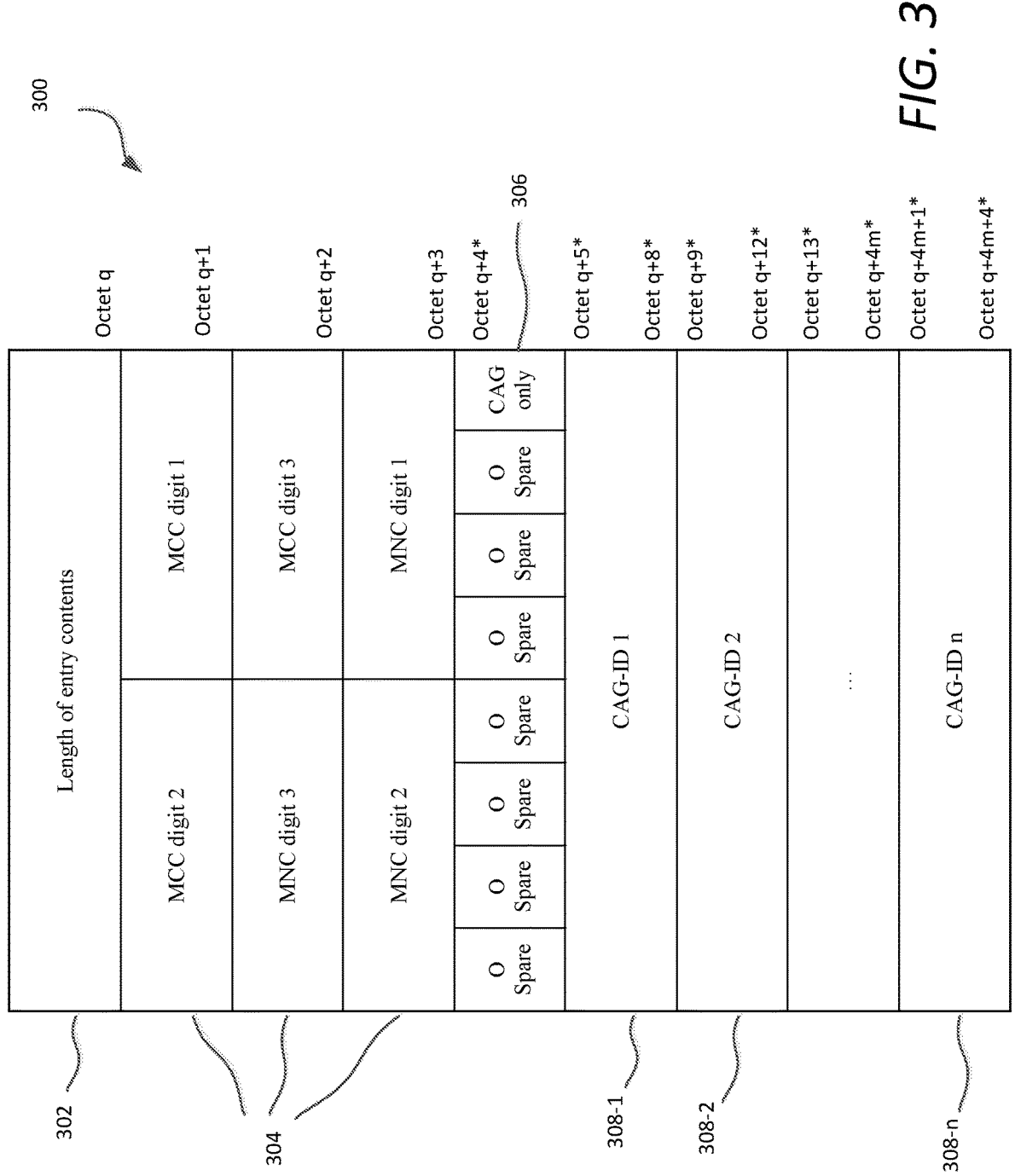
FIG. 3 shows a coded entry of the CAG information list IE of FIG. 2 according to some embodiments of the disclosure.

FIG. 3 shows a coded entry 300, e.g., the entry 206-1 of the CAG information list IE 200 of FIG. 2, according to some embodiments of the disclosure. The entry 300 can include a length of entry contents 302, a PLMN ID 304, a CAG only bit 306, seven spared bits, and CAG IDs 308-1 to 308-n. The PLMN ID 304 includes a mobile country code (MCC) and a mobile network code (MNC). The CAG only bit 306 indicates whether a UE is only allowed to access 5GS via CAG cells (CAG only). For example, if the CAG only bit 306 is set to "0," "indication that the UE is only allowed to access 5GS via CAG cells" is not set, and the UE is allowed to access 5GS via non-CAG cells. On the contrary, the CAG only bit 360 set to "1" indicates that the UE is not allowed to access 5GS via non-CAG cells. The CAG IDs 308-1 to 308-n are the identifiers of CAG cells. A CAG is identified by a CAG identifier which is unique within the scope of a PLMN ID. A CAG cell broadcasts one or multiple CAG identifiers per PLMN. A UE can compare the CAG identifiers broadcast by a CAG cell with CAG identifiers contained in the CAG information list provisioned by the network, and determine whether the CAG cell is a CAG cell that it is allowed to camp on. When the CAG only bit 306 is set to "1," the UE is only allowed to access 5GS via CAG cells associated with CAG IDs 308-1 to 308-n.

Figure 4:
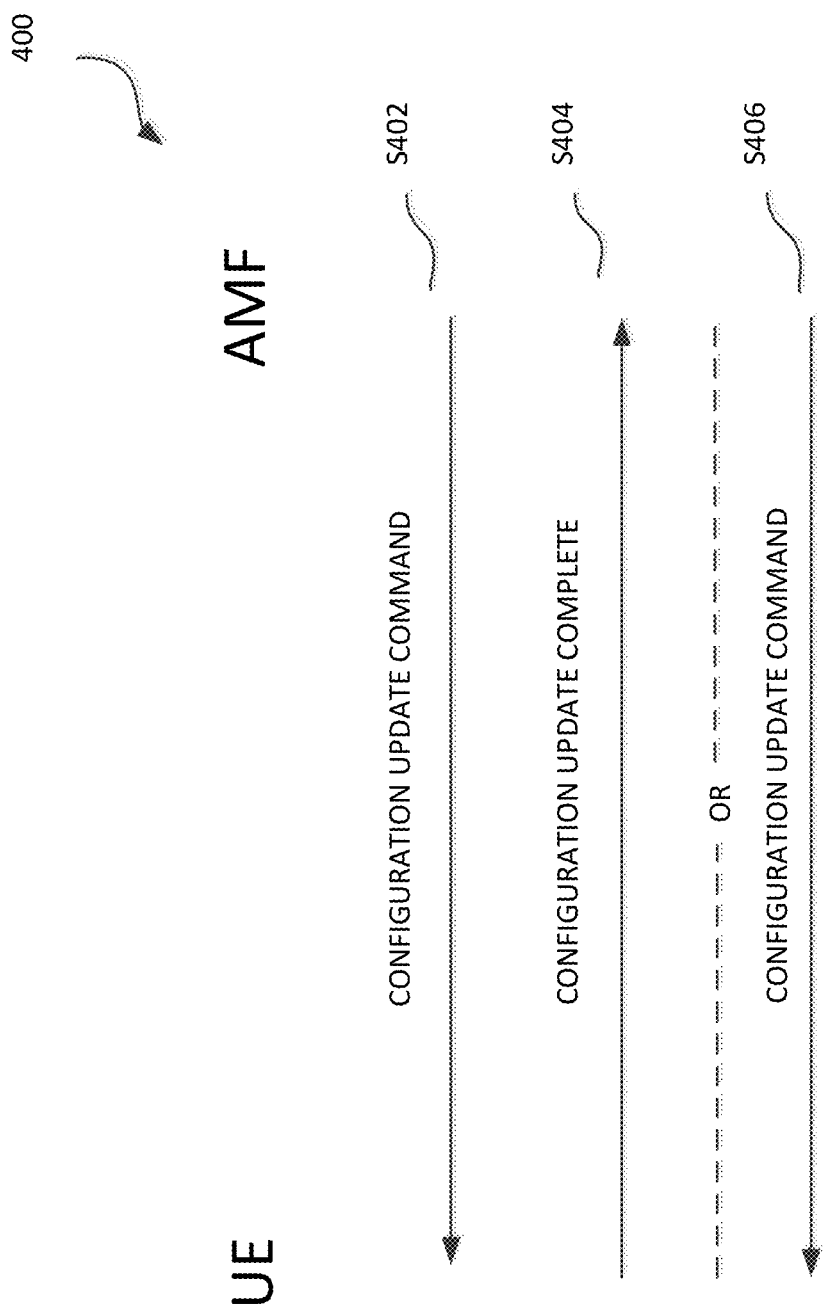
FIG. 4 is a diagram showing an exemplary generic UE configuration update procedure according to some embodiments of the disclosure.

The network (specifically, the AMF 130) can provision the CAG information list to the UE 124 in various ways. FIG. 4 is a diagram showing an exemplary generic UE configuration update procedure 400 according to some embodiments of the disclosure. The generic UE configuration update procedure 400 is initiated by the network and allows the AMF 130 to update the UE configuration for access and mobility management-related parameters decided and provided by the AMF 130 by providing new parameter information within the configuration update command. The new parameter information may include 5G-GUTI, TAI list, service area list, MICO indication, NITZ information, CAG information list, and the like. The AMF 130 can request a confirmation response (e.g., a configuration update complete) in order to ensure that the parameter has been updated by the UE 124. The generic UE configuration update procedure 400 can include steps S402 and S404 or include step S406 only. After initiating the generic UE configuration update procedure 400, the AMF 130 sends at step S402 the configuration update command message, which can include one or more parameters, such as a CAG information list. If an acknowledgement from the UE 124 is requested, the AMF 130 shall indicate "acknowledgement requested" in the acknowledge bit of the configuration update indication IE in the configuration update command message. Acknowledgement shall be requested for all parameters except when only NITZ is included in the configuration update command message. Upon receiving the configuration update command message, the UE 124, shall send a configuration update complete message, at step S404. When only NITZ is included in the configuration update command message, the generic UE configuration update procedure 400 includes step S406 only, that is the AMF 130 only sending the configuration update command message including the NITZ information at step S406, without further requesting the UE 124 to send the configuration update complete message.

Figure 5:
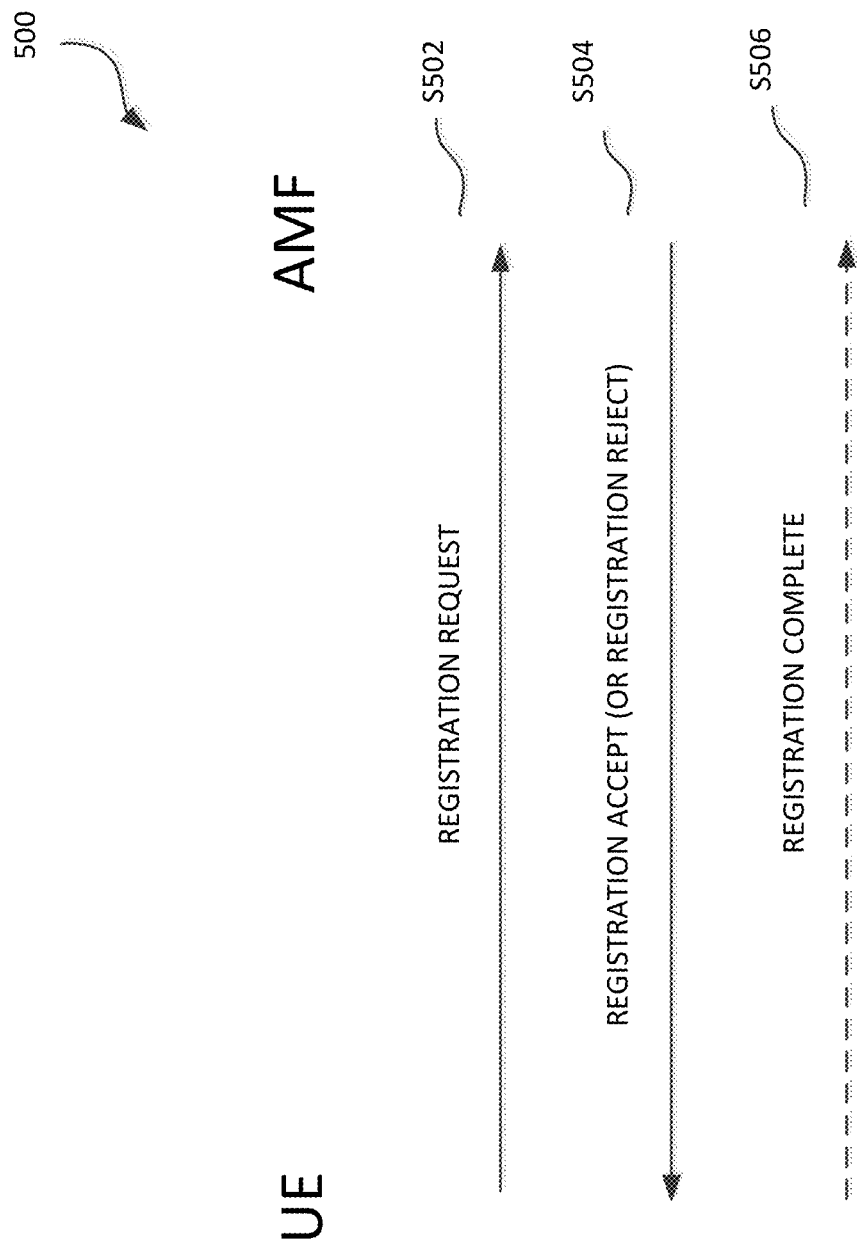
FIG. 5 is a diagram showing an exemplary registration procedure for initial registration according to some embodiments of the disclosure.

FIG. 5 is a diagram showing an exemplary registration procedure 500 for initial registration according to some embodiments of the disclosure. The registration procedure 500 can be always initiated and used by the UE 124 for initial registration for 5GS services. In the registration procedure 500, the AMF 130 can also provision a CAG information list to the UE 124. The UE 124 can send a registration request message to the AMF 130 to initiate the registration procedure 500, at step S502. The registration request message can be rejected or accepted by the network. At step S504, if the registration request message is rejected by the network, the AMF 130 shall send a registration reject message to the UE 124 including an appropriate 5GMM cause value, such as a value cause #76 (Not authorized for this CAG or authorized for CAG cells only); or if the initial registration request message is accepted by the network, the AMF 130 shall send a registration accept message to the UE 124. Mobility restrictions can be included in the registration accept message. To support CAG, the UE 124 may be pre-configured or (re)configured with an allowed CAG list, i.e., a list of CAG identifiers that the UE 124 is allowed to access, included in the subscription as part of the mobility restrictions. Therefore, the registration accept message sent by the AMF 130 to the UE 124 in the registration procedure 500 can also include a CAG information list. Upon reception of the registration accept message, the UE 124 can send a registration complete to the network, at step S506.

After provisioned by the AMF 130 to the UE 124, a CAG information list may change. For example, when rejected in the registration procedure 500 and receiving a value cause #76 (Not authorized for this CAG or authorized for CAG cells only) from a non-CAG cell, the UE 124 shall store an "indication that the UE is only allowed to access 5GS via CAG cells" (i.e., the CAG only bit 306) in the entry 300 of the CAG information list IE 200 for the current PLMN. Alternatively, if the value cause #76 is received from a CAG cell, which means that the UE 124 is not allowed to access the CAG cell, the UE 124 shall delete the CAG ID associated with the CAG cell from the "allowed CAG list" for the current PLMN. On occasion, the "allowed CAG list" may become empty.

Figure 6:
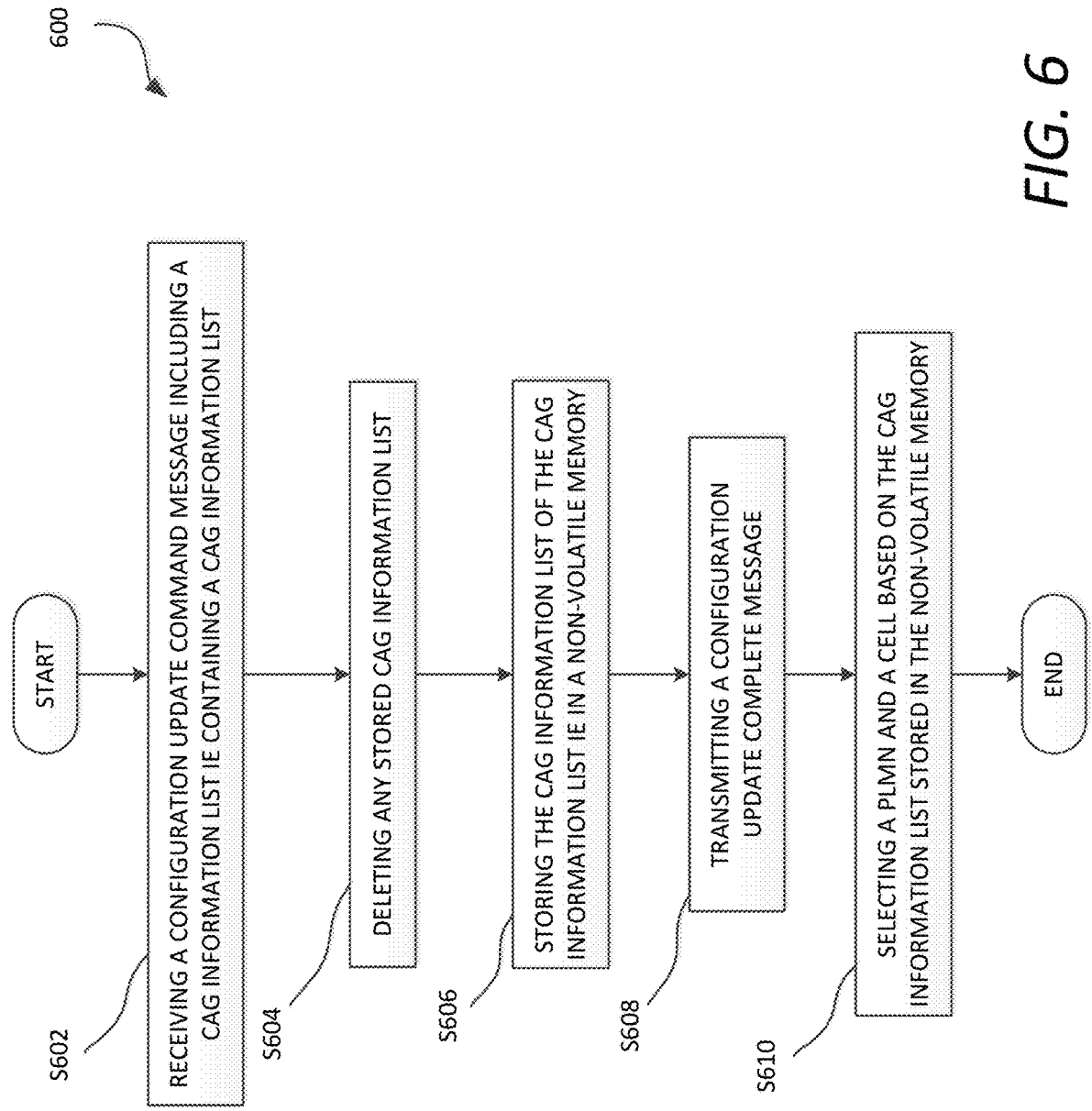
FIG. 6 is a flow chart showing an exemplary method for receiving and storing a CAG information list according to some embodiments of the disclosure.

FIG. 6 is a flow chart showing an exemplary method 600 for receiving and storing a CAG information list according to some embodiments of the disclosure. According to the method 600, the UE 124 can receive a CAG information list in the configuration update procedure 400, and store the CAG information list in a non-volatile memory.

At step S602, the UE 124 receives from the AMF 130 a configuration update command message. According to an embodiment of the disclosure, the configuration update command message can include a CAG information list IE containing a CAG information list. At step S604, the UE 124 can delete any stored CAG information list. At step S606, the UE 124 then stores the CAG information list of the CAG information list IE in a non-volatile memory. Therefore, the CAG information list will not be lost even after the UE 124 is switched off. At step S608, the UE 124 may transmit a configuration update complete message to the AMF 130 to inform the AMF 130 that it has updated the CAG information list. After switched off and then switched on again, the UE 124 can select a PLMN and a cell based on the CAG information list stored in the non-volatile memory, at step S610.

Figure 7:
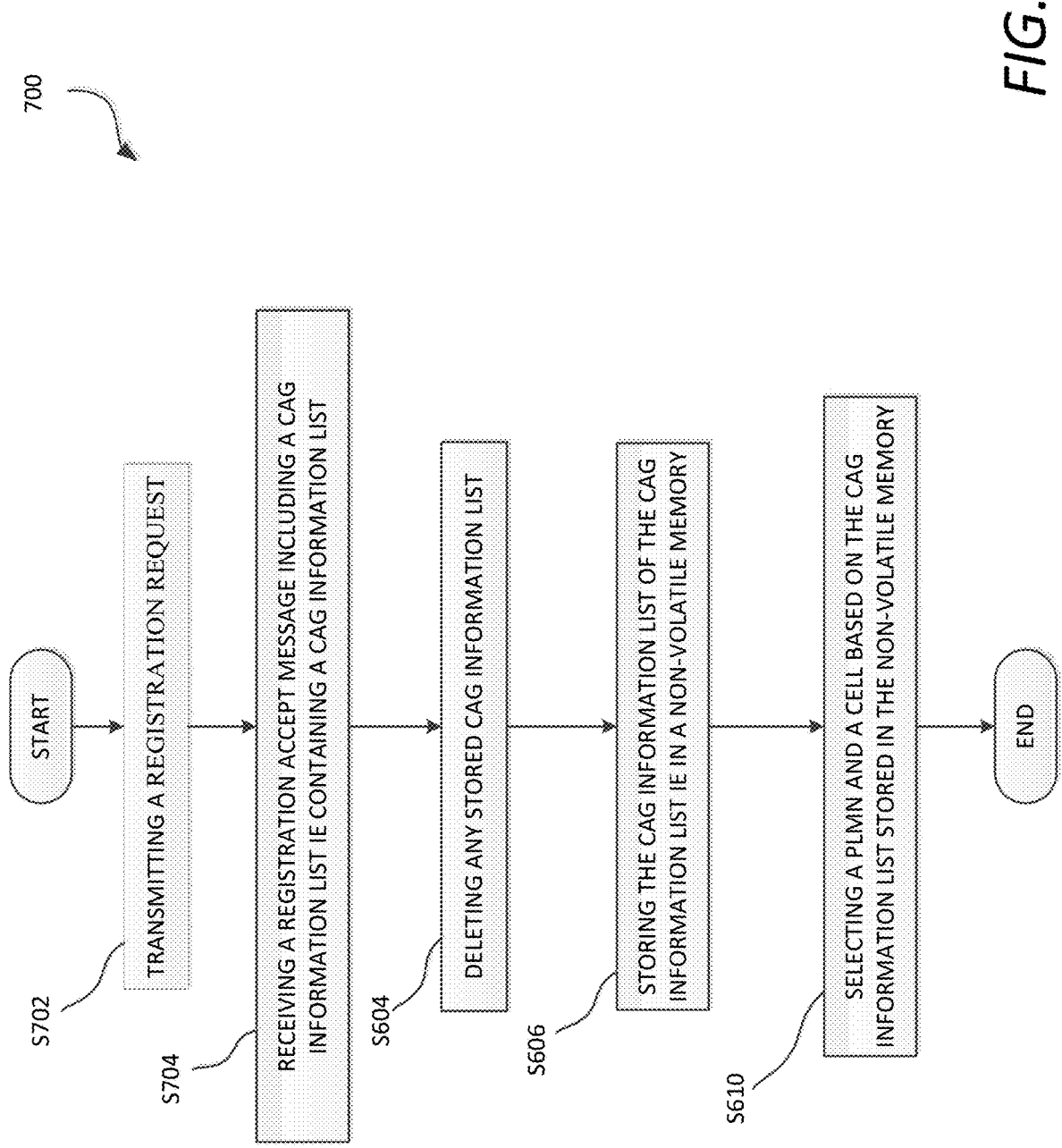
FIG. 7 is a flow chart showing another exemplary method for receiving and storing a CAG information list according to some embodiments of the disclosure.

FIG. 7 is a flow chart showing another exemplary method 700 for receiving and storing a CAG information list according to some embodiments of the disclosure. According to the method 700, the UE 124 can receive a CAG information list in the registration procedure 500, and store the CAG information list in a non-volatile memory. According to some embodiments of the disclosure, the method 700 can include steps S702, S704, S604, S606 and S610.

At step S702, the UE 124 initiates the registration procedure 500 and transmits to the AMF 130 a registration request message that indicates that the UE 124 supports CAG. In some embodiments of the disclosure, the UE 124 can set the CAG bit to "CAG Supported" in a 5GMM capability IE of the registration request message. At step S704, the UE 124 receives from the AMF 130 a registration accept message. According to an embodiment of the disclosure, the registration accept message can include a CAG information list IE containing a CAG information list. At step S604, the UE 124 can delete any stored CAG information list. At step S606, the UE 124 then stores the CAG information list of the CAG information list IE in a non-volatile memory. Therefore, the CAG information list will not be lost even after the UE 124 is switched off After switched off and then switched on again, the UE 124 can select a PLMN and a cell based on the CAG information list stored in the non-volatile memory, at step S610.

According to some embodiments of the disclosure, the non-volatile memory can be installed in a universal subscriber identity module (USIM) that can be inserted into the UE 124.

According to various embodiments of the disclosure, the non-volatile memory can be installed in the UE 124, and the UE 124 can delete the CAG information list stored in the non-volatile memory when a USIM is removed from the UE 124. In an embodiment of the disclosure, a PLMN is selected based on the CAG information list stored in the non-volatile memory when a subscription permanent identifier (SUPI) provisioned from a USIM that is inserted into the UE 124 matches a SUPI stored in the non-volatile memory. In another embodiment of the disclosure, when the SUPI provisioned from the USIM inserted into the UE 124 does not match the SUPI stored in the non-volatile memory, the CAG information list stored in the non-volatile memory is deleted.

Figure 8:
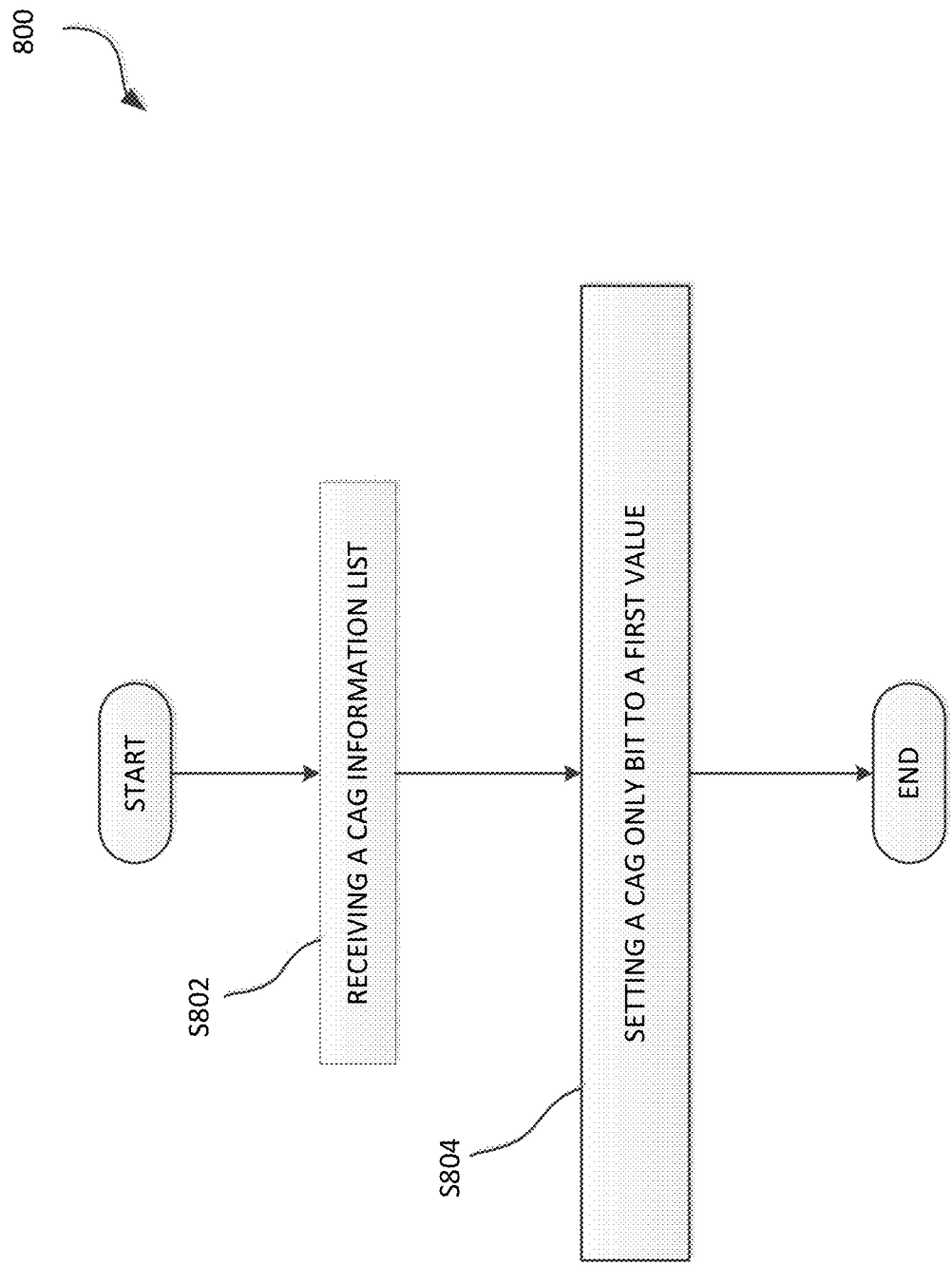
FIG. 8 is a flow chart showing an exemplary method for controlling a UE to operate when a CAG only indication is provisioned to the UE by the network while the CAG information list contains no CAG identifier according to some embodiments of the disclosure.

FIG. 8 is a flow chart showing an exemplary method 800 for controlling the UE 124 to operate when a CAG only indication is provisioned by the network while the CAG information list contains no CAG identifier according to some embodiments of the disclosure. As mentioned previously, the UE 124 can delete one or more CAG identifiers contained in the CAG information list, and all the CAG identifiers can be deleted. According to the method 800, the UE 124 can still operate normally when it is only allowed to access CAG cells even if the CAG information list does not contain any CAG identifier.

At step S802, the UE 124 is provisioned a CAG information list, a CAG only ("indication that the UE is only allowed to access 5GS via CAG cells") bit of which is "1," which indicates that the UE 124 is only allowed to access CAG cells of which CAG identifiers are contained in the CAG information list. However, the CAG information list may contain no CAG identifier originally, or become empty after the UE 124 deletes all the CAG identifiers contained in the CAG information list. In such a scenario, the method 800 can set the CAG only bit to a first value (e.g., "0"), at step 804. Therefore, the UE 124 can select any cell within a selected PLMN, without restricted by "indication that the UE is only allowed to access 5GS via CAG cells."

Figure 9:
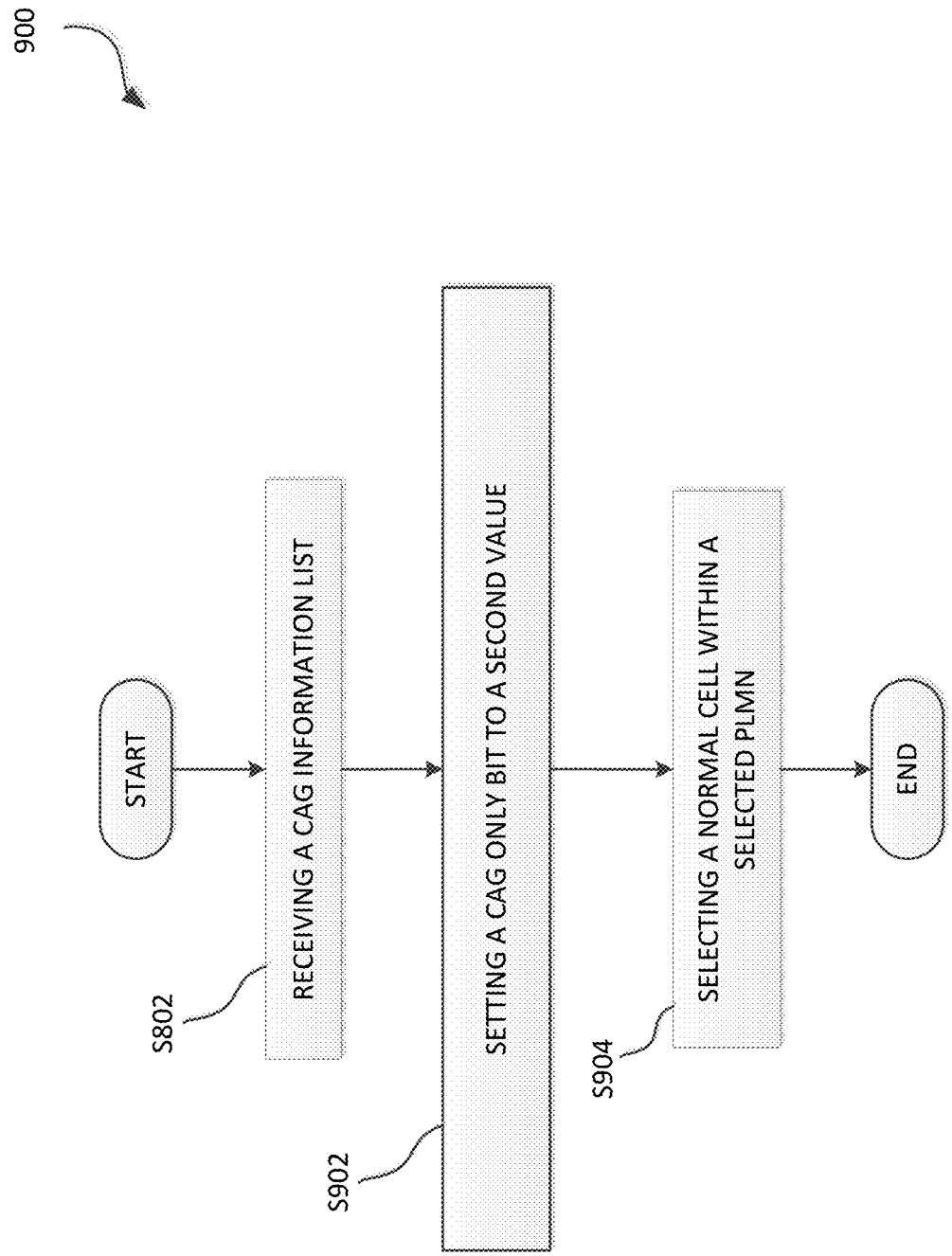
FIG. 9 is a flow chart showing another exemplary method for controlling a UE to operate when a CAG only indication is provisioned to the UE by the network while the CAG information list contains no CAG identifier according to some embodiments of the disclosure.

FIG. 9 is a flow chart showing another exemplary method 900 for controlling the UE 124 to operate when a CAG only indication is provisioned by the network while the CAG information list contains no CAG identifier according to some embodiments of the disclosure. The UE 124 can delete one or more CAG identifiers contained in the CAG information list. According to the method 900, the UE 124 can still operate normally when it is only allowed to access CAG cells even if the CAG information list does not contain any CAG identifier. According to some embodiments of the disclosure, the method 900 can include step S802, S902 and S904.

At step S802, the UE 124 is provisioned a CAG information list, a CAG only ("indication that the UE is only allowed to access 5GS via CAG cells") bit of which is "1," which indicates that the UE 124 is only allowed to access CAG cells of which CAG identifiers are contained in the CAG information list. Similarly, the CAG information list may contain no CAG identifier originally, or become empty after the UE 124 deletes all the CAG identifiers contained in the CAG information list. In such a scenario, the method 900 sets the CAG only bit to a second value (e.g., "1"), at step 902. In some embodiments of the disclosure, the CAG only bit is just left unchanged, as its value is "1" already. At step S904, despite the CAG only bit is set to "1," which means that the UE 124 is only allowed to access CAG cells, the UE 124 can still select a normal cell within a selected PLMN to camp on.

Figure 10:
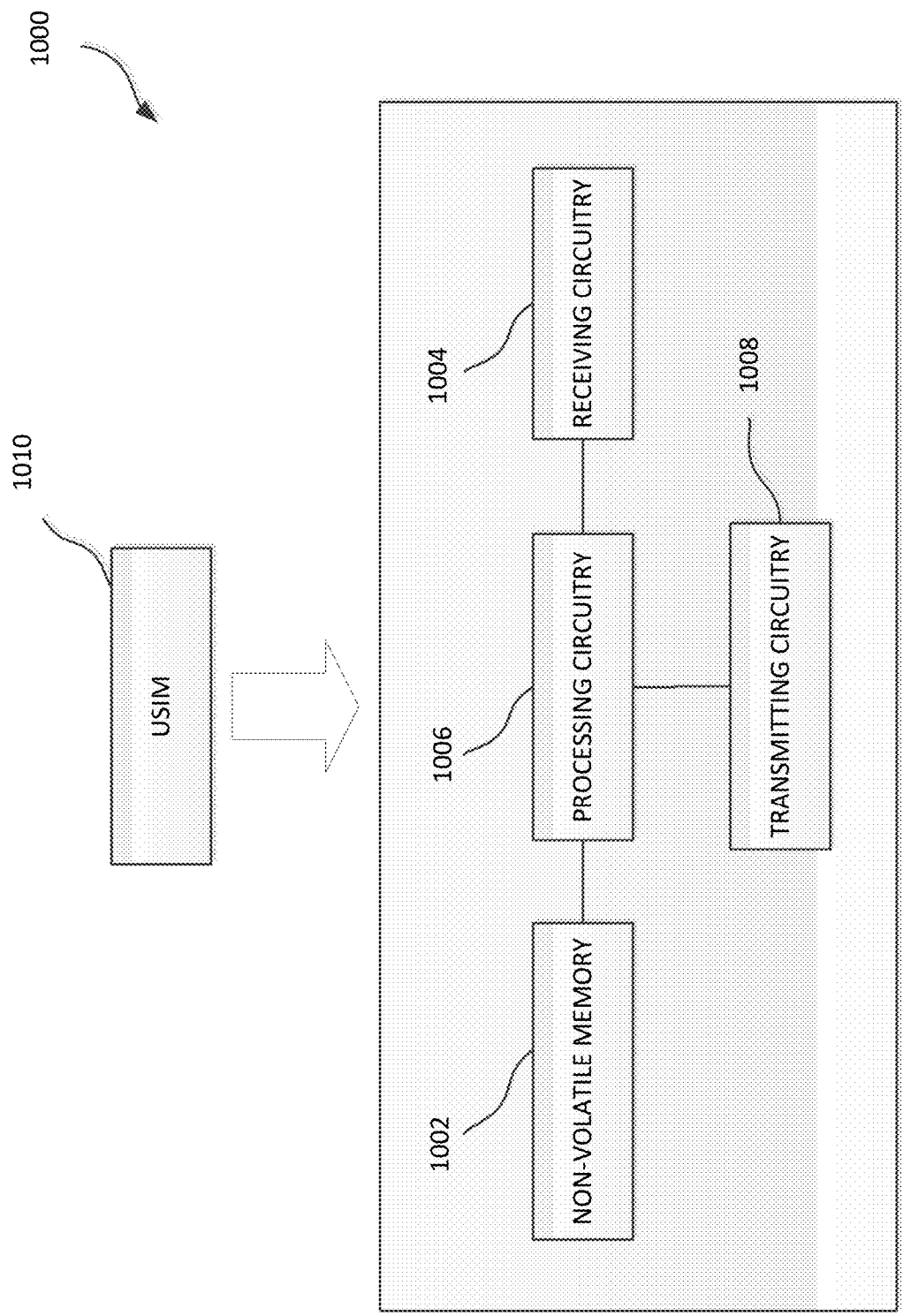
FIG. 10 is a functional block diagram showing an apparatus for receiving and storing a CAG information list according to some embodiments of the disclosure.

FIG. 10 is a functional block diagram showing an apparatus 1000 for receiving and storing a CAG information list according to some embodiments of the disclosure. According to an embodiment of the disclosure, the apparatus 1000 can be the UE 124. According to various embodiments of the disclosure, the apparatus 1000 can be a smart phone, a wearable device, an Internet of Things (IoT) device, a tablet, and the like. The apparatus 1000 can be configured to perform various functions in accordance with one or more embodiments or examples described herein. Thus, the apparatus 1000 can provide a technique for implementation of mechanisms, techniques, processes, functions, components or systems described herein. For example, the apparatus 1000 can be used to implement functions of the UE 124 in various embodiments and examples described herein. The apparatus 1000 can include a general purpose processor and/or specifically designed circuits to implement various functions, components or processes described herein in various embodiments. The apparatus 1000 can include a non-volatile memory 1002, receiving circuitry 1004, processing circuitry 1006, transmitting circuitry 1008 and a USIM 1110. In some other embodiments of the disclosure, the apparatus 1000 can optionally include other components, such as input and output devices, signal processing circuitry, and the like. Accordingly, the apparatus 1000 can be capable of performing other additional functions, such as executing application programs, and processing alternative communication protocols.

In an embodiment of the disclosure, the non-volatile memory 1002 can be a flash memory, a ferroelectric random access memory (RAM), a spin torque transfer random access memory (STTRAM), a resistive random access memory (RRAM), a conductive bridge random access memory (CBRAM), and the like. In another embodiment of the disclosure, the USIM 1010 can be inserted into the apparatus 1000.

In some embodiments of the disclosure, the transmitting circuitry 1008 can be configured to transmit a configuration update complete message in the configuration update procedure 400 and a registration request message in the registration procedure 500. In an embodiment, the registration request message indicates that the apparatus 1000 supports CAG.

In some other embodiments of the disclosure, the receiving circuitry 1004 can be configured to receive a configuration update command message in the configuration update procedure 400 and a registration accept message in the registration procedure 500. In an embodiment, each of the configuration update command message and the registration accept message can include a CAG information list IE containing a CAG information list.

In various embodiments of the disclosure, the processing circuitry 1006 can be configured to store the CAG information list of the CAG information list IE in the non-volatile memory 1002, and select a cell in a PLMN based on the CAG information list stored in the non-volatile memory 1002. In some other embodiments of the disclosure, the processing circuitry 1006 is further configured to delete any stored CAG information list.

According to some embodiments of the disclosure, the non-volatile memory 1002 can be installed in the USIM 1010.

According to various embodiments of the disclosure, the non-volatile memory 1010 can be installed in the apparatus 1000, and the processing circuitry 1006 can be further configured to delete the CAG information list stored in the non-volatile memory 1000 when the USIM 1010 is removed from the apparatus 1000. In an embodiment of the disclosure, the processing circuitry 1006 is further configured to select a PLMN and a cell based on the CAG information list stored in the non-volatile memory 1002 when a SUPI provisioned from the USIM 1010 that is inserted into the apparatus 1000 matches a SUPI stored in the non-volatile memory 1002. In another embodiment of the disclosure, when the SUPI provisioned from the USIM 1010 that is inserted into the apparatus 1000 does not match the SUPI stored in the non-volatile memory 1002, the processing circuitry 1006 is further configured to delete the CAG information list stored in the non-volatile memory 1002.

According to some embodiments of the disclosure, the CAG information list contains a CAG only indication, and the processing circuitry 1006 is further configured to set the CAG only indication of the CAG information list to a first value (e.g., "0") when the CAG information list stored in the non-volatile memory 1002 does not contain any CAG identifier. According to various embodiments of the disclosure, the CAG information list contains a CAG only indication, and the processing circuitry 1006, when the CAG information list stored in the non-volatile memory 1002 does not contain any CAG identifier for the PLMN, is further configured to set the CAG only indication of the CAG information list to a second value (e.g., "1") and select a normal cell within the selected PLMN.

In an embodiment of the disclosure, the receiving circuitry 1004, the transmitting circuitry 1008 and the processing circuitry 1006 can be a digital signal processor (DSP), an application specific integrated circuit (ASIC), a programmable logic devices (PLD), a field programmable gate array (FPGA), a digitally enhanced circuit, or a comparable device or a combination thereof. In another embodiment of the disclosure, the receiving circuitry 1004 and the transmitting circuitry 1008 can be integrated into a single transceiver.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made.

Accordingly, embodiments as set forth herein are intended to be illustrative and not limiting. There are changes that may be made without departing from the scope of the claims set forth below.

What is claimed is:

1. A method, comprising:
receiving, at a user equipment (UE), a configuration update command message including a closed access group (CAG) information list information element (IE) containing a CAG information list that is configured to list CAG identifiers of cells on which the UE is allowed to camp;
storing the CAG information list of the CAG information list IE in a non-volatile memory, the non-volatile memory being installed in the UE;
selecting a cell in a public land mobile network (PLMN) based on the CAG information list stored in the non-volatile memory when a subscription permanent identifier (SUPI) provisioned from a universal subscribed identity module (USIM) inserted into the UE matches a SUPI stored in the non-volatile memory; and
deleting the CAG information list stored in the non-volatile memory when the SUPI provisioned from the USIM inserted into the UE does not match the SUPI stored in the non-volatile memory.

2. The method of claim 1, wherein the CAG information list contains a CAG only indication that indicates that the UE is allowed to camp on the cells having the CAG identifiers listed in the CAG information list, and the method further comprises:
setting the CAG only indication of the CAG information list to a first value when the CAG information list stored in the non-volatile memory does not contain any CAG identifier.

3. The method of claim 1, wherein the CAG information list contains a CAG only indication that indicates that the UE is allowed to camp on the cells having the CAG identifiers listed in the CAG information list, and the method further comprises:
setting the CAG only indication of the CAG information list to a second value; and
selecting a normal cell associated with the selected PLMN when the CAG information list stored in the non-volatile memory does not contain any CAG identifier for the PLMN.

4. The method of claim 1, further comprising:
receiving from a CAG cell a cause value that indicates that the UE is not authorized to camp on the CAG cell, the CAG cell associated with a CAG identifier contained in the CAG information list stored in the non-volatile memory; and
deleting the CAG identifier contained in the CAG information list stored in the non-volatile memory.

5. The method of claim 1, further comprising:
deleting the CAG information list stored in the non-volatile memory when the USIM is removed from the UE.

6. A method, comprising:
transmitting, by a user equipment (UE), a registration request message indicating that the UE supports closed access group (CAG);
receiving a registration accept message including a CAG information list information element (IE) containing a CAG information list that is configured to list CAG identifiers of cells on which the UE is allowed to camp;
storing the CAG information list of the CAG information list IE in a non-volatile memory, the non-volatile memory being installed in the UE;
selecting a cell in a public land mobile network (PLMN) based on the CAG information list stored in the non-volatile memory when a subscription permanent identifier (SUPI) provisioned from a universal subscribed identity module (USIM) inserted into the UE matches a SUPI stored in the non-volatile memory of the UE; and
deleting the CAG information list stored in the non-volatile memory when the SUPI provisioned from the USIM inserted into the UE does not match the SUPI stored in the non-volatile memory of the UE.

7. The method of claim 6, further comprising:
deleting the CAG information list stored in the non-volatile memory when the USIM is removed from the UE.

8. The method of claim 6, wherein the CAG information list contains a CAG only indication that indicates that the UE is allowed to camp on the cells having the CAG identifiers listed in the CAG information list, and the method further comprises:
setting the CAG only indication of the CAG information list to a first value when the CAG information list stored in the non-volatile memory does not contain any CAG identifier.

9. The method of claim 6, wherein the CAG information list contains a CAG only indication that indicates that the UE is allowed to camp on the cells having the CAG identifiers listed in the CAG information list, and the method further comprises:
setting the CAG only indication of the CAG information list to a second value; and
selecting a normal cell associated with the selected PLMN when the CAG information list stored in the non-volatile memory does not contain any CAG identifier.

10. The method of claim 6, further comprising:
receiving from a CAG cell a cause value that indicates that the UE is not authorized to camp on the CAG cell, the CAG cell associated with a CAG identifier contained in the CAG information list stored in the non-volatile memory; and
deleting the CAG identifier contained in the CAG information list stored in the non-volatile memory.

11. An apparatus, comprising:
a non-volatile memory;
transmitting circuitry configured to transmitting a configuration update complete message and a registration request message that indicates that the apparatus supports closed access group (CAG);
receiving circuitry configured to receive a configuration update command message and a registration accept message, each of which includes a CAG information list information element (IE) containing a CAG information list that is configured to list CAG identifiers of cells on which the apparatus is allowed to camp; and
processing circuitry configured to store the CAG information list of the CAG information list IE in the non-volatile memory, select a cell in a public land mobile network (PLMN) based on the CAG information list stored in the non-volatile memory when a subscription permanent identifier (SUPI) provisioned from a universal subscribed identity module (USIM) inserted into the apparatus matches a SUPI stored in the non-volatile memory, and delete the CAG information list stored in the non-volatile memory when the SUPI provisioned from the USIM inserted into the apparatus does not match the SUPI stored in the non-volatile volatile.

12. The apparatus of claim 11, wherein the CAG information list contains a CAG only indication that indicates that the apparatus is allowed to camp on the cells having the CAG identifiers listed in the CAG information list, and the processing circuitry, when the CAG information list stored in the non-volatile memory does not contain any CAG identifier, is further configured to:
- set the CAG only indication of the CAG information list to a first value; or
- set the CAG only indication of the CAG information list to a second value and select a normal cell within the selected PLMN.

* * * * *